US006686302B1

(12) United States Patent
Moser

(10) Patent No.: US 6,686,302 B1
(45) Date of Patent: Feb. 3, 2004

(54) DIFFUSION BARRIER LAYER WITH A HIGH BARRIER EFFECT

(75) Inventor: Eva Maria Moser, Binz (CH)

(73) Assignee: EMPA Eidgenossische Materialprufungs-und Forschungsanstalt, Gallen (CH)

( * ) Notice: Subject to any disclaimer, the term of this patent is extended or adjusted under 35 U.S.C. 154(b) by 0 days.

(21) Appl. No.: 09/856,405

(22) PCT Filed: Dec. 1, 1999

(86) PCT No.: PCT/CH99/00575

§ 371 (c)(1),
(2), (4) Date: May 21, 2001

(87) PCT Pub. No.: WO00/32838

PCT Pub. Date: Jun. 8, 2000

(30) Foreign Application Priority Data

Dec. 1, 1998 (CH) .............................................. 2386/98

(51) Int. Cl.[7] ................................................ B32B 27/12

(52) U.S. Cl. .................... 442/286; 442/394; 428/300.7; 428/426; 428/537.5

(58) Field of Search ............................. 428/426, 537.5, 428/300.7; 442/394, 286

(56) References Cited

FOREIGN PATENT DOCUMENTS

| | | |
|---|---|---|
| DE | 43 18 086 | 12/1994 |
| EP | 0 176 636 | 4/1986 |
| EP | 0 575 299 | 12/1993 |
| EP | 0 778 089 | 5/1994 |
| WO | WO00/32838 | 6/2000 |

*Primary Examiner*—Elizabeth M. Cole
(74) *Attorney, Agent, or Firm*—Bachman & LaPointe, P.C.

(57) ABSTRACT

The invention relates to an organic diffusion barrier layer (58) applied to a substrate (44). Said barrier layer has an apolar skeletal structure and a high barrier effect with respect to volatile gases, vapors and liquids. The diffusion barrier layer (58) consists of a hydrocarbon polymer that is produced by means of plasma polymerization. It respectively contains 0.01–6 at % of at least one element from the group consisting of oxygen, nitrogen, fluorine, bromine, boron and silicon, whereby the total amount of said elements does not exceed 12 at %. The barrier effect of the diffusion barrier layer (58) is produced by means of at least one pulsed or continuous DC magnetron sputtering source plasma (26) or by means of inductively excited, pulsed or continuous microwave discharge (20).

11 Claims, 2 Drawing Sheets

DIFFUSION BARRIER LAYER WITH A HIGH BARRIER EFFECT

Figures 1, 1A:
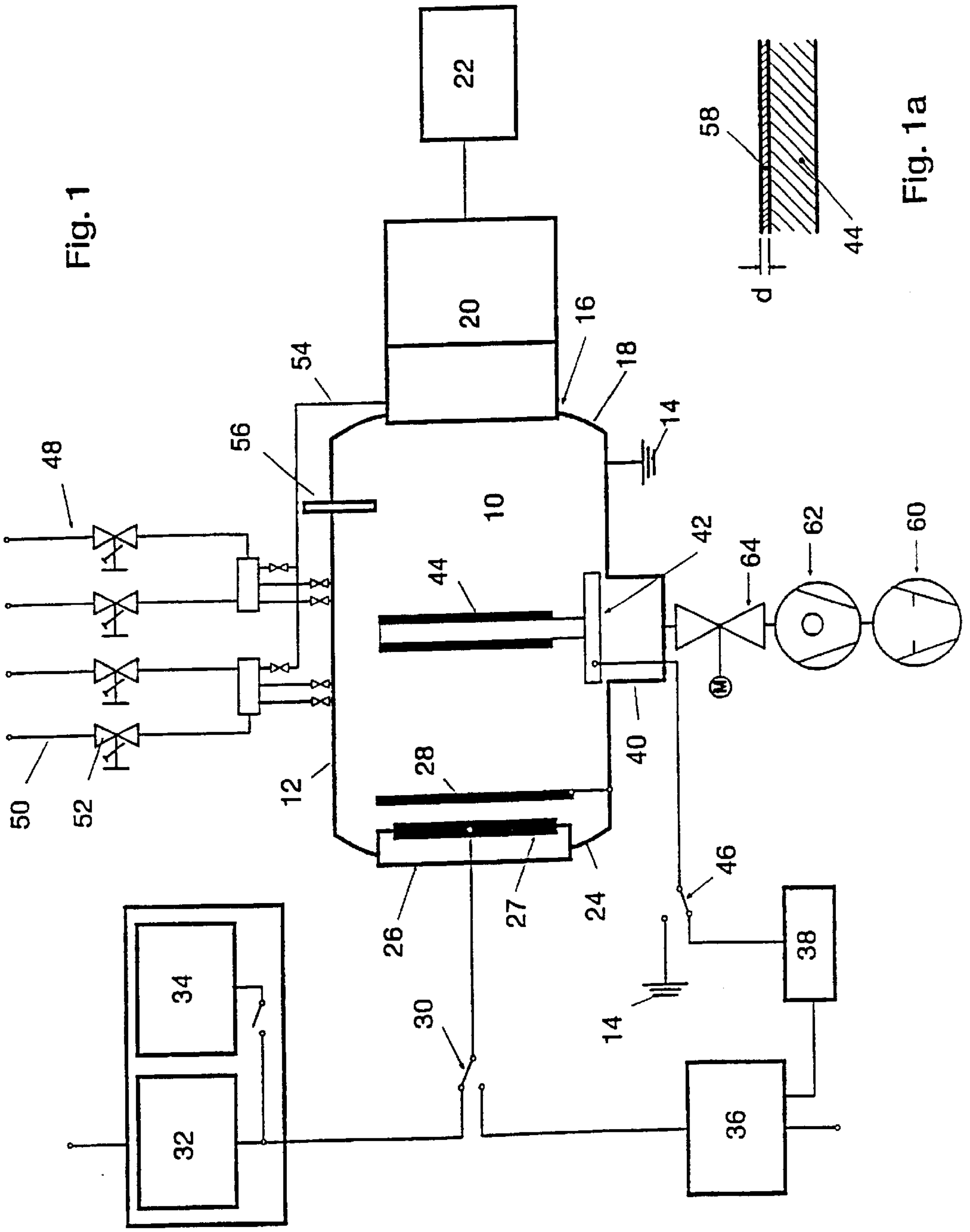

The present invention concerns a substrate with a deposited organic diffusion barrier layer. The invention also concerns a process for production of a substrate with a diffusion barrier layer and uses thereof.

The storage of foodstuffs, drugs, delicate materials and micro-electronic components for a lengthy period taking into account ambient influences is a vital problem of our time. New materials and processes to protect the stored materials against permeation of damaging gases and vapours, e.g. oxygen and water vapour, must be used in order to protect the stored materials. Plastic films as a highly functional packaging medium are already used in many places as a substitute for metal and glass elements. Taking into account environmental protection aspects, chemically inert and transparent films of polyethylene terephthalate (PET), polypropylene (PP) or polyethylene (PE) and plastic films with similar action are used to a great extent. If these films are damaged for example by heat, no toxic vapours occur. The properties of conventional PET, PP or PE films are not, however, such that they can adequately protect delicate materials as described above. For this reason in the known manner laminate structures of several layers of polymers, for example ethyl vinyl alcohol (EVOH), are used in order to compensate for the relatively low barrier properties of the individual coatings against gases.

Also, according to known processes plastic films are coated with thin diffusion blocking or barrier layers which consist of metal or metal oxides. These coatings must be thin, elastic and free from pores (pinholes) or hairline cracks (microcracks) and must not lose their permeation properties even over a long storage period.

Metal oxide barrier layers are optically transparent, microwave-compatible, and fulfil the ecological requirements, but because of their rigidity their area of application is rather limited. Plasma-polymerised coatings with compounds containing fluorine or sulphur allow the reduction of solvent permeation in plastic containers. Also, multilayer systems have been developed consisting of oxide-like barrier layers embedded in polymer-like materials.

Thin hydrocarbon barrier coatings have proved good alternatives to stiff, brittle metal oxide barrier layers, as described for example in WO,A1 96/28587 and EP,A1 0739655. These thin hydrocarbon coatings are preferably produced by means of DC magnetron discharge processes, high frequency or microwave discharge.

DE,A1 4316349 also describes the production of diffusion barrier layers in hollow bodies, where this is achieved by means of a microwave process.

The two European patent specifications EP,B1 0381110 and 0381111 propose the production of a protective coating for electroactive passivate coating of semi-conductor elements generated by means of a high frequency low pressure plasma deposition of gaseous hydrocarbons.

U.S. Pat. No. 5,041,303 describes the production of inorganic and diamond-like diffusion barrier layers which are produced by means of electromagnetic energy in the microwave frequency range. Finally EP,B1 0575299 describes the production of a barrier film by means of high frequency plasma process, where the barrier layer is deposited in a vacuum chamber from a plasma generated from non-saturated hydrocarbons, amongst others.

EP-A1 0176636 discloses a thin polymerised film of high density, high hardness and high strength. This layer is deposited on the surface of a substrate by plasma polymerisation. The gas used to generate the plasma contains a halogenated alkane and/or an alkane with either hydrogen and/or a halogen. The atomic ratio halogen/hydrogen in the gas lies in the range of 0.1:1 to 5:1. The plasma temperature lies in the reaction zone range at 6000° K. or higher but below 30,000° K. The pressure during polymerisation is 0.001 to 1 Torr. The thin polymer layer is used as a protective coating for numerous objects, also as a harder surface, rust protection coating, scratch protection, gas barrier etc. The protective coating is particularly suitable as a protective film for magnetic data carriers.

In particular, in the area of application described above, storage of commodities, for example delicate drugs or similar, it is important that the permeation of oxygen and other gases is low or almost zero and this impermeability remains guaranteed even at high ambient humidity. It is quite possible, using the metal oxide coatings described in the state of the art, to generate a high oxygen barrier effect but usually this diminishes greatly, i.e. the oxygen permeation increases, as the ambient or relative humidity rises. In particular, in tropical zones this trend constitutes a major problem which can lead to premature degradation of foodstuffs and drugs.

The task of the present invention is to create a substrate with an improved diffusion barrier layer which has better barrier properties against oxygen and other gases, in particular at high ambient humidity.

According to the invention the task is solved with regard to a substrate with a diffusion barrier based on carbon and hydrogen at a content of 20–80 at % of both elements, whereby the barrier effect of the diffusion barrier layer is sustained even in damp air.

Preferably, in the diffusion barrier layer at least one element of the group according to the paragraph above has a content of 0.1–3 at %.

The diffusion barrier layer is constructed on the basis of carbon and hydrogen, preferably with a content of 20–80 at % but in particular 30–70 at %.

The diffusion barrier layer as stated is preferably largely a hydrocarbon plasma polymer with non-polar basic structure, i.e. the diffusion barrier layer is produced by plasma polymerisation of at least one hydrocarbon monomer, preferably with maximum 8 C-atoms, with inert gases mixed in. The diffusion barrier layer can be produced by means of the plasma of a magnetron sputtering source or by combination of the sputtering source with the plasma-induced gas phase polymerisation. Alternatively, the barrier layer can be produced by means of inductively coupled microwave discharge.

When DC magnetron sputtering plasma is used, it has proved advantageous to overlay this with a plasma-induced gas phase polymerisation and apply an LF/HF (10 kHz–100 MHz) induced negative bias potential to the substrate.

In the case of a microwave discharge, it has proved advantageous for the hydrocarbon gas-inert gas mixture to be processed with a surplus of hydrocarbon gas. The inert gas can be helium, neon, argon or other inert gases as pure gases, but according to a preferred embodiment advantageously a mixture of argon and helium is used.

When a magnetron sputtering source is used, preferably a hydrocarbon-inert gas mixture is used, the latter in particular in the form of helium, neon and/or argon.

With reference to the plasma polymerisation for production of a substrate with diffusion barrier layer, the task is solved according to the invention in that the barrier layer is produced by means of at least one pulsed or continuous DC magnetron sputtering source plasma or by means of inductively coupled pulsed or continuous microwave discharge.

Preferably, the reactor is first evacuated to a pressure below $5.10^{-3}$ mbar, preferably below $1.10^{-4}$ mbar, then the reaction gases added until a value not above 1 bar, preferably not above 10 mbar, is reached and maintained. The power of the energy source with a sample diameter of around 12 cm is suitably 50–1000 W, in particular maximum around 500 W.

For the process according to the invention a wide range of reactive gas components can be used in particular an alkane, alkene or alkyne and/or mixtures thereof, also with at least one inert gas as carrier gas. The inert gas used in plasma polymerisation is for example helium, neon, argon or mixtures thereof. In the case of a pulsed DC magnetron sputtering source preferably helium is used, in the case of an inductively coupled microwave discharge, a mixture of argon and helium.

All reactive gas components are suitably used as pure hydrocarbon gases. In particular methane, ethane, propane or unsaturated hydrocarbons of ethane, propane, butane but also alkynes, separately or mixed with other components.

The use of diffusion barrier layers according to the invention is as stated extremely wide. Preferred applications concern the coating of polymer materials such as in particular flexible polymer films. These diffusion barrier layers are extraordinarily effective protective coatings against gases, water vapour, aromatics, organic and inorganic volatile compounds and liquids in particular against watery liquids. The coated polymer films consist for example of polypropylene, polyethylene, polyamide, amended sheet polyethylene terephthalate etc. Laminate films of the said polymers and objects formed, blown or deep-drawn from the films, such as in particular containers, are covered by the term polymer films.

A further use of a substrate with diffusion barrier layer according to the invention lies in packing materials, in particular for sterilisation or pasteurisation of a product arranged in the packing. Here containers in direct contact with the foodstuff are extraordinarily important for the inner and outer coating. Naturally moist foodstuffs are particularly delicate, the diffusion barrier layers according to the invention are particularly suitable for use in damp environments. Packing materials consist of polymers, for example polypropylene PP, polyethylene PE, polyamide PA, PET, and laminate films made from various polymer materials, e.g. PP/PE, PET/PP, PET/PE, PE/PA. Such packing materials, e.g. foils, can be fitted i.e. coated or laminated with barrier layers according to the invention. Because of the good flexibility or mechanical properties of the diffusion barrier layers applied, foils coated in this way can easily be rolled and unrolled. Also, such packing materials are particularly suitable for foodstuffs as no organoleptic or chemical changes to the filling according to the Foodstuffs Law can occur. The said migration protection and perm-selectivity is particularly important for the packing of foodstuffs as foodstuffs are often packed under inert gas ($CO_2$, $N_2$ or mixtures thereof). The higher permeability of $CO_2$ in comparison with oxygen consequently gives additional protection to the filling. Thus, the barrier layer is often required to provide a high oxygen and water vapour barrier.

Further advantageous possible applications are listed merely in brief:

- UV protection
- medical engineering, protective coatings for implants, in particular in moist environments, sterilisation and as protective coatings for treatment instruments, sterilisation
- protective coatings for ceramic material and glass-like objects, carbon and glass fibres and/or composite materials thereof, against volatile and non-volatile compounds, in particular chemicals
- protective coatings for polymer strips and tapes
- protective coatings for recycled products.

As well as the broad application spectrum another substantial advantage of the diffusion barrier layers according to the invention lies in their sterilisability or pasteurisability. The following known processes can be used in order to sterilise or pasteurise products (films, containers, coated materials) equipped with diffusion barrier layers proposed according to the invention:

- sterilisation with water vapour and water in autoclaves up to 150° C., in particular up to 135° C.; no mechanical damage and no subsequent discoloration of the coating
- sterilisation with gases (ethylene oxide, $H_2O_2$ etc), no chemisorption or adsorption of gases on the chemically inert barrier layer
- high pressure sterilisation
- gamma sterilisation
- high pressure, gamma and plasma sterilisation
- pasteurisation at 70–100° C.

The present invention is described in more detail using design examples shown in drawing and table form.

Figure 2:
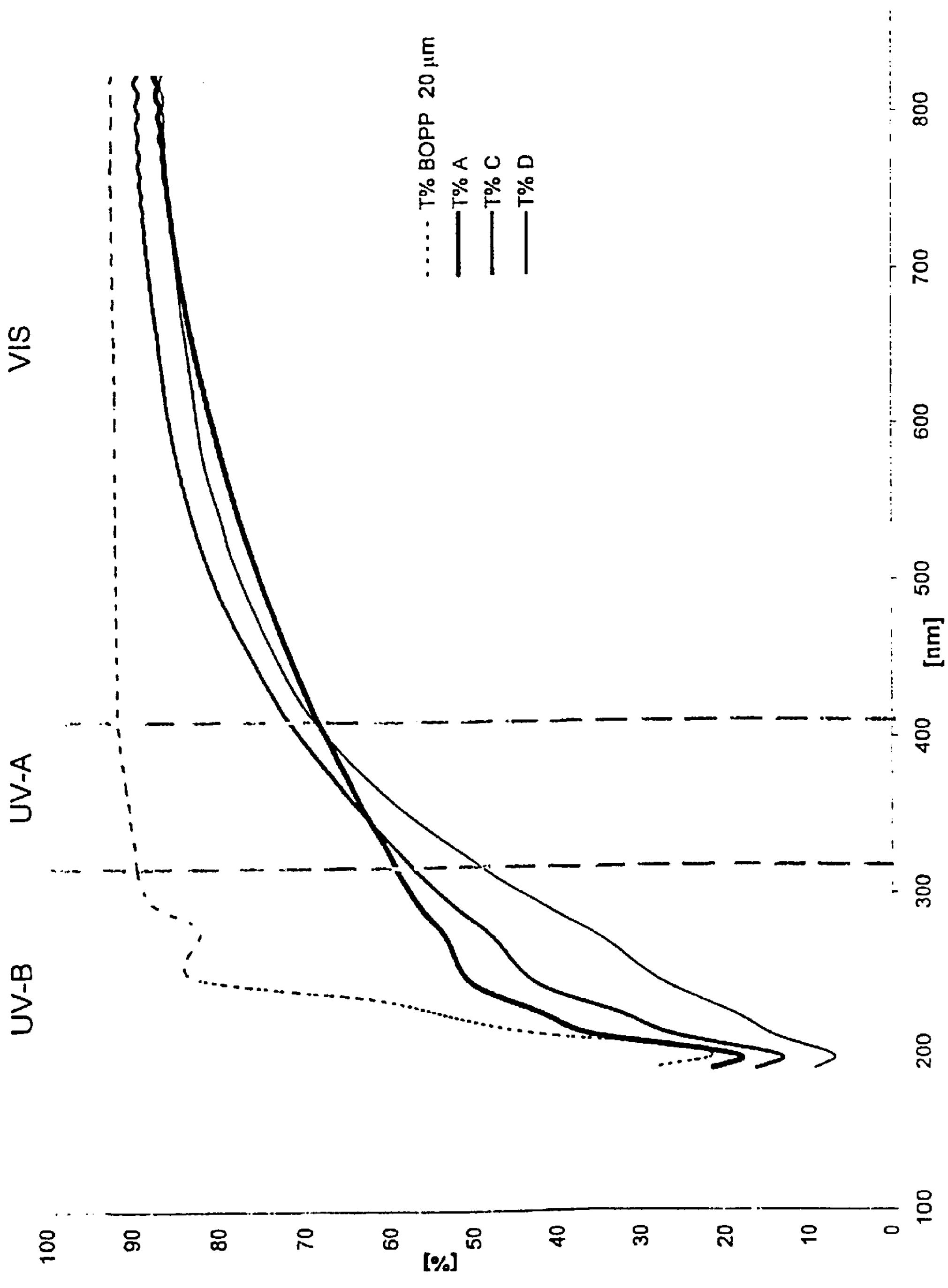

The drawings show diagrammatically:

FIG. 1 a CVD reactor used for plasma generation for production of diffusion barrier layers, FIG. 1*a* a part section through a coated substrate and FIG. 2 UV-VIS transmission spectra.

FIG. 1 shows a substantially cylindrical horizontal CVD (chemical vapour deposition) reactor 10 which is suitable for production of a plasma necessary for performance of the process according to the invention, in particular a universal low temperature plasma. The CVD reactor 10 has a solid corrosion-resistant steel casing 12 and is connected to earth 14. At least one quartz window 16 in the steel casing 12 allows microwaves to be coupled into the inside of the reactor.

On the right side of the front 18 is integrated a microwave head 20 which is supplied electrically by a microwave generator 22.

On the opposite left side of the front 24 of the CVD reactor is fitted a DC/HF magnetron 26 with a carbon target 27 which in turn has a screening plate 28. The carbon target 27 preferably has a purity of at least 99.9%. A relay 30 can switch from a DC generator 32 with pulse unit 34 to an HF generator 36 with preset bias 38.

A pump stand is connected by way of an approximately longitudinally centrally arranged closeable flange 40. A substrate holder 42 is positioned inside the CVD reactor 10. On this substrate holder 42 is mounted a substrate 44 to be coated. Naturally, in industrial practice a whole battery of substrates 44 is fitted in the CVD reactor 10.

The substrate holder 42 is connected to the bias 38 by way of a further relay 46. When relay 46 switches, the substrate holder 42 is earthed.

A gas system 48 in the present case comprises four gas supply lines 50 each with a controllable valve 52 for supplying reaction and carrier gases. The gas system 48 is also structured in the known manner, being supplied by way of the cylindrical steel casing 12. A branch line 54 leads to the quartz window 16 of the microwave head 20.

The CVD reactor 10 is evacuated by a pre-vacuum pump 60 with a preconnected turbo pump 62, by way of a butterfly control valve 64 which is electromagnetically operated.

Finally, into the CVD reactor 10 through the cylinder casing of the steel casing 12 is introduced a pressure measurement device 56 which is highly sensitive and can measure pressures down to the range of $1.10^{-9}$ mbar.

A CVD reactor 10 is suitable for performance of all processing procedures according to the invention using various gases and mixtures thereof, flow rates, working pressures and other known and tested plasma process parameters. Production processes are possible in the frequency range from 10 kHz to 100 GHz and in DC operation while a negative potential is applied by way of the bias 38 to the substrate 44 or this is connected to earth 14.

The reaction start pressure in the reactor is around $10^{-2}$ mbar. The power for a specimen of diameter of approximately 12 cm is 50 to 1000 W, microwave or DC starting power. In the case of the DC magnetron 26 sputtering process, a carbon target 27 of a purity of at least 99.9% (quality: pure) and a continuous electrical supply of energy or a pulse frequency of approximately 25 kHz are selected, the microwave discharges are also performed by continuous or pulsed mode.

FIG. 1*a* shows a part section through a substrate 44, coated in a CVD reactor 10 according to FIG. 1, in the form of a flexible polymer film with a diffusion barrier layer 58 of a thickness d of around 100 nm.

FIG. 2 shows the transmission spectra of an uncoated BOPP (biaxial oriented polypropylene) film around 20 μm thick and three coated BOPP films 44 approximately 50 nm thick. The abscissa shows the wavelength of the UV radiation in nm and the ordinate the transmission in percent. The uncoated BOPP film shown with dotted lines, like the three coated BOPP films, shows a marked drop in transmission in the area of a UV wavelength of around 200 nm. At longer wavelengths above 200 nm all four curves rise relatively steeply, that of the uncoated BOPP film has already reached around 90% of the complete transmission at around 300 nm wavelength. After leaving this UV-B range, the curve for the uncoated BOPP film remains largely constant, the curves of the three coated BOPP films continue to rise relatively steeply in this UV-A range. Above the UV-A range, in the VIS range above 400 nm wavelength with visible light, the three said curves rise less steeply. The range above 800 nm wavelength is not considered further here.

Characteristic properties of the three selected coatings A, B and C in FIG. 2 are given in Table 1, e.g. as further optical properties the refractive index and the total light permeability are given. For light-sensitive foodstuffs the conservability can be increased further. A corresponding increase in coating thickness would reinforce this effect further.

The following Tables 1 to 3 give the properties of various diffusion barrier layers 58 (FIG. 1*a*) and their production conditions. Table 2 lists the permeation properties of the hydrocarbon barrier layers at various relative humidities. Finally, table 3 shows the perm-selectivity i.e. the different permeabilities for gases, of pure hydrocarbon coatings.

TABLE 1

Selected Coatings

| Spec | $OXTR^2$ | $OXTB^2$ | $WVTR^c$ | Thickness [nm] | Flexibility [%] | $CO_2$-$TR^8$ | $N_2TR^8$ |
|---|---|---|---|---|---|---|---|
| A | <1.1 ± .2 | <1.1 ± .2 | <0.6 ± .2 | 20 ± 2 | >2.5 ± .2 | 24.0 ± .2 | 2.0 ± .3 |
| B | <14.2 ± .2 | — | <14.2 ± .2 | 58 ± 2 | >6.1 ± .2 | — | — |
| C | <1.1 ± .2 | <0.7 ± .2 | <0.4 ± .2 | 73 ± 2 | >2.8 ± .2 | 14.0 ± .4 | 2.0 ± .3 |
| $C^1$ | <2.1 ± .2 | — | — | 93 ± 2 | >3.71 ± .2 | — | — |
| $C^2$ | <3.1 ± .2 | <2.05 ± .2 | <5.6 ± .2 | 62 ± 2 | >3.41 ± .2 | 15.0 ± .3 | 2.0 ± .3 |
| $C^3$ | <39.3 ± .2 | <18.7 ± .2 | <12.6 ± .2 | 35 ± 2 | >8.8 ± .2 | — | — |
| D | <1.0 ± .2 | <1.1 ± .2 | <0.1 ± .2 | 114 ± 2 | >1.9 ± .2 | 21.0 ± .3 | 7.0 ± .3 |
| E | 1.1 ± .2 | <1.1 ± .2 | <0.2 ± .2 | 131 ± 2 | >2.2 ± .2 | — | — |
| F | <0.8 ± .2 | <0.7 ± .2 | <0.1 ± .2 | 16 ± 2 | >1.8 ± .2 | — | — |
| $F^1$ | <2.5 ± .2 | <2.0 ± .2 | <1.9 ± .2 | 140 ± 2 | >2.3 ± .2 | — | — |
| $F^2$ | <3.1 ± .2 | <1.9 ± .2 | <1.0 ± .2 | 130 ± 2 | >2.6 ± .2 | — | — |
| $F^3$ | <7.4 ± .2 | <3.8 ± .2 | — | 105 ± 2 | >3.8 ± .2 | — | — |
| $F^4$ | <2.1 ± .2 | <1.7 ± .2 | <1.8 ± .2 | 110 ± 2 | >2.3 ± .2 | — | — |
| $F^5$ | <2.1 ± .2 | <2.0 ± .2 | <2.8 ± .2 | 98 ± 2 | >2.9 ± .2 | — | — |
| $PET^g$ | 133.2 ± .2 | 93.0 ± .2 | 20.3 ± 2 | 12 μm | — | 726 ± 2 | 18.7 ± .2 |
| $SIO_x{}^h$ | 2.6 ± .2 | 2.4 ± .2 | 0.9 ± 2 | 36 ± 3 | 1.7 ± .2 | 54 ± 1 | 1.8 ± .1 |

| Spec | Density [g/cm$^3$] | nγ = 589 nm | Transm | Chemical Composition [at %] C | H | O | N | F | Ar | Discharge |
|---|---|---|---|---|---|---|---|---|---|---|
| A | 1.58 | 2.26 | 63 | 70.9 | 25.9 | <0.4 | <0.1 | <0.1 | <3.5 | DC/earth |
| B | 1.22 | — | 86 | 55.0 | 45.0 | <0.1 | <0.1 | <0.1 | <0.1 | DC/earth |
| C | 1.46 | 1.89 | 77 | 64.5 | 23.3 | <0.1 | <0.1 | <0.1 | <0.1 | DC/bias |
| $C^1$ | 1.40 | — | — | 68.2 | 30.7 | <0.8 | <0.3 | <0.1 | <0.1 | DC/bias |
| $C^2$ | 1.51 | 1.51 | — | 70.5 | 28.2 | <1.0 | <0.3 | <0.1 | <0.1 | DC/bias |
| $C^3$ | 1.03 | — | 77 | 46.7 | 46.7 | <6.5 | <0.1 | <0.1 | <0.1 | DC/earth |
| D | 1.39 | 1.86 | 76 | 67.1 | 32.9 | <0.1 | <0.1 | <0.1 | <0.1 | MW/earth |
| E | 1.44 | — | 74 | 69.0 | 31.0 | <0.1 | <0.1 | <0.1 | <0.1 | MW/bias |
| F | 1.54 | 1.83 | 76 | 67.6 | 32.4 | <0.1 | <0.1 | <0.1 | <0.1 | MW/earth |
| $F^1$ | 1.36 | — | — | 71.4 | 25.7 | <2.7 | <0.2 | <0.1 | <3.5 | MW/earth |
| $F^2$ | — | — | — | 73.4 | 23.4 | <0.1 | <3.2 | <0.1 | <0.1 | MW/earth |
| $F^3$ | 1.24 | — | — | 69.0 | 24.1 | <0.5 | <6.4 | <0.1 | <0.1 | MW/earth |
| $F^4$ | 1.32 | — | — | 69.0 | 28.6 | <3.5 | <3.5 | <0.1 | <0.1 | MW/earth |
| $F^5$ | 1.16 | — | — | 64.1 | 23.1 | <3.2 | <9.6 | <0.1 | <0.1 | MW/earth |

TABLE 1-continued

| Selected Coatings | | | | |
|---|---|---|---|---|
| PET[g] | — | 1.576 | 89 | MW/earth |
| $SiO_x$[h] | — | 1.458 | 84 | |

Legend:
a: Oxygen, carbon dioxide and nitrogen permeability [ccm($m^2$.d.bar)]: ASTM D 3985-95 at 0% relative humidity and 23° C.
b: Oxygen permeability [ccm($m^2$.d.bar)]: ASTM D 3985-95 at 85% relative humidity and 23° C.
[c]Water vapour permeability [g/m__.d]: ASTM F1249-90 Standard Test Method at 90% relative humidity and 23° C. (American Society for Testing and Materials, 1997)
d: Crack elongation in %: microcrack formation on a coated 12 μm PET film
e: Total light permeability [CIE: Y value, 10°, D65]: ASTM D 10003-92
f: Carbon dioxide and nitrogen permeability [ccm/($m^2$.d.bar)]: Lyssy GPM 500 at 0% relative humidity and 23° C.
[g]12 μm thick PET film (polyethylene terephthalate)
[h]36 nm $SiO_x$ coated 12 μm thick PET film.
DC: DC magnetron sputter process,
MW: microwave discharge.
The hardness cf the coatings lies in the range of 1–30 Vickers hardness.

TABLE 2

Summary of Permeation Properties of Pure Hydrocarbon Barrier layers on 12 μm Thick PET Film

| No. | Measurement Conditions | Permeation $O_2$ [ccm/m__*day*bar] | Reduction in permeation at r.H | Measurement Condition | Permeation $H_2O$ [g/m__*day] | Coating Thickness [nm] | Permeation $O_2$ [ccm/m__*day*bar] after sterilisation | Flexibility [%] | Coating Process |
|---|---|---|---|---|---|---|---|---|---|
| D | 23° C./dry | 1.3 ± .1 | | 23° C./100% r.H | 0.2 ± .2 | 102 ± 3 | 3.9 ± .1 | 2.1 ± .2 | Microwave |
| | 23° C./50% r.H | 1.1 ± .1 | | 33° C./100% r.H | 0.4 ± .2 | 108 ± 3 | 4.6 ± .1 | 1.8 ± .2 | |
| | 23° C./70% r.H | 1.0 ± .1 | | | | | | | |
| | 23° C./85% r.H | 0.9 ± .1 | 31% | | | | | | |
| F | 23° C./dry | 1.1 ± .1 | | 23° C./100% r.H | 0.1 ± .2 | 96 ± 3 | 3.2 ± .1 | 1.8 ± .2 | Microwave |
| | 23° C./50% r.H | 0.9 ± .1 | | 33° C./100% r.H | 0.3 ± .2 | 106 ± 3 | 6.3 ± .1 | 1.5 ± 2 | |
| | 23° C./70% r.H | 0.8 ± .1 | | | | | | | |
| | 23° C./85% r.H | 0.7 ± .1 | 36% | | | | | | |
| C[2] | 23° C./dry | 3.2 ± .1 | | 23° C./100% r.H | 0.4 ± .2 | 55 ± 3 | 9.2 ± .1 | >3.0 ± .2 | DC |
| | 23° C./50% r.H | 2.5 ± .1 | | 33° C./100% r.H | 0.5 ± .2 | 69 ± 3 | 10.9 ± .2 | >2.9 ± .2 | magnetron |
| | 23° C./70% r.H | 2.4 ± .1 | | | | | | | |
| | 23° C./85% r.H | 1.6 ± .1 | 50% | | | | | | |
| Ref. | 23° C./dry | 133.2 ± .2 | | 23° C./100% r.H | 20.3 ± .2 | — | — | — | |
| PET | 23° C./50% r.H | 99.8 ± .2 | | 33° C./100% r.H | 37.3 ± .2 | — | — | — | |
| | 23° C./70% r.H | 95.7 ± .2 | | | | | | | |
| | 23° C./85% r.H | 93.0 ± .2 | 30% | | | | | | |
| ref. | 23° C./dry | 2.6 ± .1 | | 23° C./100% r.H | 0.8 ± .2 | 36 ± 3 | 64.5 ± .2 | 1.7 ± .2 | Evaporation |
| SiOx | 23° C./50% r.H | 2.4 ± .1 | | 33° C./100% r.H | 0.9 ± .2 | 36 ± 3 | 78.9 ± .2 | | |
| | 23° C./70% r.H | 2.3 ± .1 | | | | | | | |
| | 23° C./85% r.H | 2.4 ± .1 | 8% | | | | | | |

Table 1 shows a summary of the properties of diffusion barrier layers 58 (FIG. 1*a*) of amorphous hydrocarbon of various thicknesses on a 12 μm thick PET film. For specimens A to $F^5$, for example, the oxygen, water vapour, nitrogen, carbon dioxide gas permeability, the density, the refractive index and the chemical composition are listed. For comparison, the corresponding values are given for an uncoated PET film and a film coated with organic $SiO_x$.

The samples shown in Table 1 are optimised coatings deposited onto PET film which have excellent barrier properties against water vapour, oxygen and nitrogen and to a reduced extent also against carbon dioxide. All coatings, irrespective of whether produced by DC magnetron discharge or microwave discharge, have excellent barrier properties with low oxygen and nitrogen contents. Comparison tests with hydrocarbon coatings with relatively high oxygen and nitrogen contents each of >6 at % show in comparison with the invention a great increase in gas permeability or a great decrease in barrier properties.

The fact that the low oxygen permeation of non-polar hydrophobic HC coatings is maintained or increased even at high relative humidities is shown by the results in Table 2. The two coating specimens D and F, on an increase in humidity from dry to around 85% relative humidity, show a decrease in oxygen permeation of 31% or 36%, where the microwave coating process was applied. Coating sample C2 also shown in Table 1 shows a decrease of 50% in oxygen permeation from dry to 85% relative humidity, where in this case the diffusion barrier layer was produced by pulsed DC magnetron sputtering and overlaid plasma polymerisation. An excess of hydrocarbon gas was used during the process and a negative bias potential applied to the substrate.

The perm-selectivity shown in Table 3 of plasma-polymerised barrier layers is based on isostatic permeability measurements with a dry gas mixture of $CO_2$, $O_2$ and $N_2$ at a slightly high room temperature.

TABLE 3

Perm-selectivity of plasma-polymerised barrier layers

| Specimen | $CO_2$ | $O_2$ | $N_2$ | $N_2/O_2$ | $CO_2/O_2$ |
|---|---|---|---|---|---|
| A | 24.0 | 5.0 | 2.0 | 0.4 | 4.8 |
| C | 14.0 | 3.0 | 2.0 | 0.7 | 2.4 |

TABLE 3-continued

Perm-selectivity of plasma-polymerised barrier layers

| Specimen | $CO_2$ | $O_2$ | $N_2$ | $N_2/O_2$ | $CO_2/O_2$ |
|---|---|---|---|---|---|
| $C^2$ | 15.0 | 4.0 | 2.0 | 0.5 | 3.75 |
| D | 21.0 | 7.0 | 7.0 | 1.0 | 3.0 |
| PET film | 725.5 | 136.9 | 18.7 | 0.14 | 5.3 |
| $SiO_x$/PET | 53.8 | 3.4 | 1.8 | 0.53 | 16.0 |

Legend:

a. Carbon dioxide, oxygen and nitrogen permeability [ccm/($m^2$.d.bar)]: ASTM D 3985-95 at 0% relative humidity and 23° C.

As a reference example Table 3 shows the oxygen permeation of a pure PET film and a PET film coated with silicon oxide. The pure PET film in the dry state has a high oxygen permeation which, however, decreases as the humidity increases. This behaviour is material-specific, it is known that other polymer films do not behave in this way. In the case of coating with silicon oxide, the oxygen permeation reduces by only around 8% on a rise in relative humidity. Consequently the polar metal oxide coating causes a weakening in the property of PET whereas the non-polar hydrocarbon coatings have a permeation behaviour similar to PET. A substantial disadvantage of silicon oxide barrier layers for packing, however, is that the oxygen permeation after sterilisation, compared with the hydrocarbon coatings according to the invention, is sunstantially higher, which is extremely unfavourable, in particular in the case of foodstuff packing and medical technology.

In order to achieve the low content of oxygen, nitrogen fluorine, chlorine, bromine, boron and/or silicon in the diffusion barrier layer required according to the invention, in performance of the coating processes the following conditions are required:

CVD reactor in which reproducible coatings can be achieved (high vacuum, no gasifying components), use of pure monomer gases or hydrocarbon gases, use of pure inert gases e.g. helium, neon, argon etc.

If sputtering from a carbon target, it is important that a target of pure carbon is used with a purity of >99.9%.

The process parameters claimed according to the invention and listed in Tables 1 to 3, however, not only take into account high barrier effects but they are also selected such that at least equally good mechanical properties can be achieved in the coatings. As an example, and importantly in the case of coating plastic films, the flexibility or crack elongation % is shown in Table 1.

The diffusion barrier layers shown in table form according to the invention are characterised in that the elongation to microcrack formation can be tailored to the product. The range for a good diffusion barrier layer is 1 to 10% but can sometimes be more. The crack elongation naturally depends on the coating thickness which is normally 10 to 1000 nm, preferably ≦300 nm, in particular 20 to 200 nm. The flexibility of the coatings is attributable to their polymer-like nature which also causes excellent adhesion of the diffusion barrier layers according to the invention on polymer substrates. Consequently, the coated substrates are mechanically resistant and can for example be processed on all possible machines for production of laminate films (wound and moulded).

In the coating of metallic or ceramic substrates, the good adhesion of the diffusion barrier layer is guaranteed by way of the carbon bonding.

Further properties of the multi-functional diffusion barrier layers studied according to Tables 1 and 3 are as follows:

they are functionally stable for a long time (tested >1 year), transparent, microwave-compatible, chemically resistant and hence not solvent-sensitive, easy to laminate, in particular with conventional adhesives, a certain degree of peelability, in particular if welded with polymer materials such as polymer films (e.g. PET) or other materials, absorbent in the UV range, therefore good UV protection for contents (FIG. 2), suitable for foodstuffs as no organoleptic and chemical changes occur in the packed product or contents, protection against migration from packaging materials such as for example additives or contamination, and protection against migration from the product to the packing (aromatics etc), perm-selectivity i.e. differing permeability of gases e.g. carbon dioxide, nitrogen or mixtures thereof (Table 3).

For a better understanding of the invention and in particular the development of the process parameters according to the invention, the performance of experiments for the production of Tables 1 to 3 is explained in more detail below. Here, it proved advantageous to compare the properties of the hydrocarbon coatings deposited on PET films which were deposited firstly using DC magnetron sputtering processes (plasma polymerisation processes) and secondly by means of microwave discharges. The process parameters can however be transferred to other known plasma processes.

EXAMPLE 1

In a DC magnetron discharge (continuous or bipolar pulsed) with overlaid plasma-induced gas phase polymerisation, the plasma reactor was evacuated to a base pressure of $\leqq 2\times10^{-5}$ mbar. Carbon was sputtered from the carbon target, in addition by way of the gas inlets a polymerisable $C_xH_y$ gas mixture was continuously supplied to the plasma reactor. Also, an inert gas or inert gas mixture can be introduced into the plasma chamber. The supply of energy (DC, continuous or pulsed) ignites the plasma. The diffusion barrier layer consisting of pure hydrocarbon is deposited onto the substrate, where the process duration and belt speed determine the coating thickness, gas concentration, gas.

EXAMPLE 2

In a microwave discharge (pulsed or continuous; magnetic field supported or without magnetic field) the plasma reactor was evacuated to a base pressure of $\leqq 2\times10^{-5}$ mbar. By way of the gas inlet a polymerisable $C_xH_y$ gas mixture, which can also contain inert gases is supplied continuously into the plasma reactor. The microwave energy (2, 45 GHz) (pulsed or continuous) is coupled inductively. After ignition of the plasma the required energy is set so that the pure hydrocarbon plasma coating is deposited.

Parameters for examples 1 and 2 related to the CVD reactor shown in FIG. 1.

| | |
|---|---|
| Power: | 50–1000 Watt |
| Negative bias potential for substrate NF/HF (10 kHz–200 MHz) or DC: | −10 to −700 V |

-continued

| | |
|---|---|
| Working pressure: | $5.10^{-3}$–50 mbar |
| Gas flow $C_xH_y$: | 10–200 sccm |
| Gas flow He, Ar: | 10–200 sccm |

When the process is scaled up or transferred, the parameters listed are modified accordingly.

Analysis of Specimens

The oxygen permeability was measured at 0% relative humidity, 23° C. in accordance with ASTM D 3985-95 using a Mocon OX-TRAN 2/20 instrument. The water vapour permeability measurements were performed with a Lyssy L 80-4000 permeation tester. The total light permeability of the coated and untreated PET films was determined according to ASTM D 10003-92 (CIE: Y value 10°, D65).

The coating thickness was determined by means of a profilometer (Tencor P10) on a silicon wafer. The hydrogen content, possible contaminants and the density of the coatings were tested on coated Si (100) substrates using Rutherford backscattering (RBS), elastic recoil detection analysis (ERDA) and x-ray photo-electronic spectroscopy (XPS).

The elastic behaviour (elongation, flexibility) was tested using a process based on interferometry by stretching the coated films. The method of measuring the elastic behaviour was developed at EMPA. The formation of microcracks on the stretched test films and their effect on the diffusion barrier properties were determined by a combination of scanning electron microscopy and permeability measurements. The AFM pictures of the substrate and the coated PET films were taken at room temperature conditions using a Bioscope AFM (Digital Instruments) and an Explorer AFM (TopoMetrix, Model TMX 2000) in scanning mode and non-contact mode. A periodic test of the diffusion properties was performed over one year on carefully selected test specimens (23° C., 0% relative humidity) to determine the long term behaviour.

Results of Film Coatings

The first half of Table 1 shows the properties of coatings ($A–C^3$) produced by means of bipolar pulsed DC magnetron processes, and the second half those of coatings D to $F^5$ produced by means of microwave discharge. A correlation with the water vapour data can be noted. Furthermore, elongation values of more than 6% were achieved for coatings with slightly lower barrier effects (OXTR: 14 $cm^3/m^2$.d.bar).

An untreated PET film has a morphology consisting of 10 to 20 nm wide "clusters" and RMS roughness of around 0.8 nm. All coatings studied show a very homogeneous morphology with an RMS roughness of 1.5 to 2.5 nm and a grain size of 20–40 nm. The structure of the coated films is very similar and dependent neither on the discharge method nor on the deposition parameters.

The substrate holder with specimens was both earthed and biased in the frequency range of 10 kHz to 200 MHz. As a result of the negative potential at the substrate, the ions in the plasma peripheral layer were accelerated towards the substrate so they impacted with higher energy. It is expected that the density of the coatings is higher and the permeability values lower. However, the flexibility of the coatings decreases as the density increases. In addition, the deposition rate increases due to the application of a negative potential.

What is claimed is:

1. Substrate (44) with a deposited organic diffusion barrier layer (58) which has a non-polar basic structure with a high barrier effect against highly volatile gases, vapors and fluids, where the diffusion barrier layer (58) consists of a hydrocarbon polymer produced by means of plasma polymerization which contains 0.01–6 at % of at least one element of the group consisting of oxygen, nitrogen, fluorine, chlorine, bromine, boron and silicon, in total however maximum 12 at %, the improvement comprising:

the diffusion barrier layer based on carbon and hydrogen has a content of 20–80 at % of both elements, whereby the barrier effect of the diffusion barrier layer (58) is sustained in air having a relative humidity of 50% and higher.

2. Substrate (44) with a diffusion barrier layer (58) according to claim 1, wherein the barrier layer contains at least one element of the group in a content of 0.1–3 at %.

3. Substrate (44) with a diffusion barrier layer (58) according to claim 1, wherein the diffusion barrier layer (58) has a carbon and hydrogen content of each of 30–70 at %.

4. Substrate (44) with a diffusion barrier layer (58) according to claim 1, wherein the diffusion barrier layer (58) has a coating thickness of ≦300 nm.

5. Substrate (44) with a diffusion barrier layer (58) according to claim 1, wherein the substrate (44) is a polymer material or paper, in particular a polycarbonate, polyethylene terephthalate, polypropylene, polyethylene, polyamide or other composites thereof, coated paper, textiles, carbon fibers or a composite thereof, a ceramic material, glass or glass fibers.

6. Process for production of a substrate (44) with a diffusion barrier layer (58) according to claim 1, wherein the barrier layer (58) is formed by at least one of pulsed or continuous DC magnetron sputtering source plasma (26), or by means of inductively coupled pulsed or continuous microwave discharge (20).

7. Process according to claim 6, wherein a reactor (10) is evacuated to a pressure below $5.10^{-3}$ mbar, then reaction gases are supplied until a value no higher than 1 bar is reached and maintained.

8. Process according to claim 6, wherein the power of the energy source for flat specimens of around 12 cm diameter is 50–1000 W.

9. Process according to claim 7, wherein as a reactive gas component pure hydrocarbon gases are used in particular alkanes such as methane, ethane or propane, alkenes such as ethene, propene or butene or alkynes such as polypropylene, all separate or mixed with other hydrocarbon gases.

10. Substrate (44) with a diffusion barrier layer (58) according to claim 1, wherein the substrate comprises one of a polymer material and a flexible polymer film (44) including recycled materials.

11. Substrate (44) with a diffusion barrier layer (58) according to claim 1, wherein the substrate comprises one of paper, textiles, carbon fibers, ceramic material, glass, glass fibers and composites thereof.

* * * * *

UNITED STATES PATENT AND TRADEMARK OFFICE
CERTIFICATE OF CORRECTION

PATENT NO. : 6,686,302 B1 Page 1 of 1
DATED : February 6, 2004
INVENTOR(S) : Eva Maria Moser It is certified that error appears in the above-identified patent and that said Letters Patent is hereby corrected as shown below:

Title page,
Item [73], Assignee, "Gallen" should read -- St. Gallen --.

Signed and Sealed this

Eighteenth Day of May, 2004

JON W. DUDAS
*Acting Director of the United States Patent and Trademark Office*